US012606959B2

(12) United States Patent
Hietaniemi et al.

(10) Patent No.: US 12,606,959 B2
(45) Date of Patent: Apr. 21, 2026

(54) TREATMENT SYSTEM FOR MANUFACTURE OF PAPER, BOARD OR THE LIKE

(71) Applicant: KEMIRA OYJ, Helsinki (FI)

(72) Inventors: Matti Hietaniemi, Espoo (FI); Asko Karppi, Espoo (FI); Markus Korhonen, Espoo (FI); Markus Kvist, Espoo (FI)

(73) Assignee: KEMIRA OYJ, Helsinki (FI)

( * ) Notice: Subject to any disclaimer, the term of this patent is extended or adjusted under 35 U.S.C. 154(b) by 316 days.

(21) Appl. No.: 18/039,654

(22) PCT Filed: Dec. 1, 2021

(86) PCT No.: PCT/FI2021/050831

§ 371 (c)(1),
(2) Date: May 31, 2023

(87) PCT Pub. No.: WO2022/117921

PCT Pub. Date: Jun. 9, 2022

(65) Prior Publication Data

US 2024/0093433 A1 Mar. 21, 2024

(30) Foreign Application Priority Data

Dec. 2, 2020 (FI) .................................... 20206240

(51) Int. Cl.
| | |
|---|---|
| *D21H 21/18* | (2006.01) |
| *C09D 103/02* | (2006.01) |
| *D21H 11/14* | (2006.01) |
| *D21H 17/00* | (2006.01) |
| *D21H 17/26* | (2006.01) |
| *D21H 17/29* | (2006.01) |
| *D21H 17/43* | (2006.01) |
| *D21H 17/45* | (2006.01) |
| *D21H 23/04* | (2006.01) |
| *D21H 27/00* | (2006.01) |

(52) U.S. Cl.
CPC ............. *D21H 21/18* (2013.01); *D21H 11/14* (2013.01); *D21H 17/26* (2013.01); *D21H 17/29* (2013.01); *D21H 17/43* (2013.01); *D21H 17/455* (2013.01); *D21H 17/72* (2013.01); *D21H 23/04* (2013.01); *D21H 27/00* (2013.01); *C09D 103/02* (2013.01)

(58) Field of Classification Search
CPC ........ D21H 21/18; D21H 11/14; D21H 17/26; D21H 17/29; D21H 17/43; D21H 17/455; D21H 17/72; D21H 23/04; D21H 27/00; C09D 103/02
See application file for complete search history.

(56) References Cited

U.S. PATENT DOCUMENTS

| | | | |
|---|---|---|---|
| 11,242,653 B2 | 2/2022 | Jackson et al. | |
| 2003/0188840 A1 | 10/2003 | Van Handel et al. | |
| 2004/0118540 A1* | 6/2004 | Garnier .................. | D21H 17/37 |
| | | | 162/168.3 |
| 2008/0149287 A1 | 6/2008 | Hagiopol | |
| 2012/0118523 A1 | 5/2012 | Lu et al. | |
| 2013/0299109 A1 | 11/2013 | Kemira et al. | |
| 2015/0144282 A1 | 5/2015 | Oyj | |
| 2016/0032530 A1 | 2/2016 | Oyj | |
| 2016/0289896 A1 | 10/2016 | Oyj | |
| 2017/0284028 A1 | 10/2017 | Oyj | |
| 2018/0327974 A1 | 11/2018 | Kemira et al. | |
| 2021/0102343 A1 | 4/2021 | Oyj | |

FOREIGN PATENT DOCUMENTS

| | | |
|---|---|---|
| WO | 2018122446 A1 | 7/2018 |
| WO | 2018229345 A1 | 12/2018 |
| WO | 2021130411 A1 | 7/2021 |

OTHER PUBLICATIONS

Search Report and Examination Opinion issued in the Chinese Application No. 202180081199.3, mailed Mar. 25, 2025 (19 Pages).
International Search Report and Written Opinion in Application No. PCT/FI2021/050831, mailed Mar. 25, 2022, 12 pages.
Search Report in Finnish Application No. 20206240, dated Jun. 4, 2021, 2 pages.
Notice of Intention to Grant issued in European App. No. 21823337.7, dated Oct. 28, 2025, 7 pages.

* cited by examiner

*Primary Examiner* — Catherine S Branch
*Assistant Examiner* — Andrea Wu
(74) *Attorney, Agent, or Firm* — Meunier Carlin & Curfman LLC

(57) ABSTRACT

The invention relates to a chemical treatment system for manufacture of paper, board or the like and to a method employing it. The system comprises a first component, which is a glyoxylated polyacrylamide having a net cationic charge density and obtained by glyoxylation of a cationic polyacrylamide base polymer having a weight average molecular weight MW in a range of 30 000-500 000 g/mol. The system further comprises a second component, which comprises a mixture of at least a high-amylopectin starch, and an anionic first polymer, which has a weight average molecular weight MW >200 000 g/mol. The second component has a net cationic charge density in a range from 0.05 meq/g to 0.9 meq/g, when measured at pH 2.8, and a net anionic charge density in a range from −2 meq/g to −0.1 meq/g, when measured at pH 7.

20 Claims, No Drawings

TREATMENT SYSTEM FOR MANUFACTURE OF PAPER, BOARD OR THE LIKE

CROSS REFERENCES

This application is a U.S. national stage application of international patent application number PCT/FI2021/050831 filed on Dec. 1, 2021 claiming priority to Finnish national application number FI20206240 filed on Dec. 2, 2020.

FIELD OF THE INVENTION

The present invention relates to a chemical treatment system for manufacture of paper, board or the like according to the preambles of the enclosed independent claims.

BACKGROUND OF THE INVENTION

In manufacture of paper or board the properties of the fibre stock as well as the final paper or board are modified by adding various chemical auxiliaries to the fibre stock before the formation of the paper or board web. A property, often desired for the final paper or board, is the dry strength. The strength properties are of special interest when the paper or board is made from recycled fibres. The recycled fibres generally have lower strength properties than virgin fibres. As the level of recycled fibres is continuously increasing in the paper and board manufacture due to the increased consumer awareness and general interest in sustainability, the amount of recycled fibres with low or extremely low strength properties in the fibre stock is consequently increasing. At the same time, the recycling degree of the individual fibres is increasing, which means that the same fibres are recycled more and more times. This leads to deterioration of the recycled fibre properties, including ever shortening fibre length and fibre hornification, which consequently lead to deterioration of the properties, especially the strength properties, of the produced fibre web. This deterioration of the properties can be counteracted by use of chemical auxiliaries.

Synthetic polymers are commonly used auxiliaries in papermaking to increase the strength properties of the final paper or board. Polymers may be added to the fibre stock where they interact with the components of the stock, such as fibres, and improve the properties of the final fibre web. However, especially the recycled fibres do not always provide optimal interaction with the added polymers. In case the surface charges of the fibres are low, for example, due to extensive recycling and repulping, the interaction between the added polymer and the fibres is less intensive as expected. Also disturbing substances, which may be accumulated into circulating waters used to prepare the fibre stock, may interfere the interaction between the polymer and the fibres. Consequently, there is a constant need to find new effective substances, compositions or combinations, which could be used to increase the strength properties of the produced paper and board, especially when ever increasing amount of recycled fibres are used.

SUMMARY OF THE INVENTION

An object of this invention is to minimise or even eliminate the disadvantages existing in the prior art.

An object of the present invention is also to provide a chemical treatment system which provides effective increase in dry strength properties of the final paper or board.

Another object of the present invention is also to provide a chemical treatment system which improves the dry strength properties of paper and board made by using recycled fibres.

These objects are attained with the invention having the characteristics presented below in the characterising parts of the independent claims. Some preferable embodiments are disclosed in the dependent claims.

The embodiments mentioned in this text relate, where applicable, to all aspects of the invention, the treatment system, its use as well as the method for manufacture of paper, board or the like, even if this is not always separately mentioned.

A typical chemical treatment system according to the present invention for manufacture of paper, board or the like, comprises
- a first component, which is a glyoxylated polyacrylamide having a net cationic charge density and obtained by glyoxylation of a cationic polyacrylamide base polymer having a weight average molecular weight MW in a range of 30 000-500 000 g/mol, and
- a second component, which comprises a mixture of at least
  - a high-amylopectin starch, and
  - an anionic first polymer, which has a weight average molecular weight >200 000 g/mol, wherein the second component has a net cationic charge in a range from 0.05 meq/g to 0.9 meq/g, when measured at pH 2.8, and a net anionic charge in a range from −2 meq/g to −0.1 meq/g, when measured at pH 7.

A typical use according to the present invention of a chemical treatment system comprising a first component and a second component according to the invention is by addition of the chemical treatment system to a fibre stock for improving strength properties of paper, board or the like.

A typical method according to the present invention for manufacture of paper, board or the like, comprises
- obtaining a fibre stock comprising cellulosic fibres,
- adding to the fibre stock a chemical treatment system according to the present invention and comprising a first component and a second component, wherein the first component and the second component are added to the fibre stock in form of aqueous solutions.

DETAILED DESCRIPTION OF THE INVENTION

Now it has been surprisingly found that when the chemical treatment system comprising the first component and the second component as defined in the present invention are used together, an unexpected improvement is obtained in the strength properties of the final paper, board or the like, especially when the fibre stock comprises recycled fibres. The reason for the surprising results is not presently fully understood, but it is speculated that the high molecular weight of the base polymer of glyoxylated polyacrylamide in the first component may provide effective and far-reaching interaction with the constituents of the second component. It is speculated a high number of various bonds are formed between the first component and the second component of the chemical treatment system as well as with the components of the fibre stock, which also facilitate the improvement in strength. Even without full theoretical explanation, it has been observed that the present invention provides strength increase, for example SCT strength increase, that clearly exceeds the expectations.

It has been observed that the chemical treatment system according to the present invention provides strength increase for the final paper, board or the like, when the fibre stock has a zeta potential value close to zero, e.g. from −15 mV to −1 mV, preferably from −12 mV to −2 mV, which is often case with the fibre stocks comprising recycled fibres. The chemical treatment system is able to successfully interact with the (recycled) fibres, even if their surface charge is low, as indicated by the zeta potential value of the fibre stock.

The first component and the second component of the chemical treatment system according to the present invention may be added to the fibre stock separately, and preferably successively. According to one preferable embodiment the first component and second component are added to the thick fibre stock having consistency at least 2 weight-%, for example 2-6 weight-%, calculated as dry fibre, separately and successively. More preferably the first component is added to the fibre stock before the second component. The time lapse between the addition of the first component and the second component is preferably long enough to guarantee the effective mixing of the first component to the stock before the addition of the second component.

The first component of the chemical treatment system is a glyoxylated polyacrylamide having a net cationic charge density. The first component is in form of aqueous solution and it may have a solids content of 3-7 weight-% and it may be added in this form to the fibre stock. The glyoxylated polyacrylamide is obtained by glyoxylation of a cationic polyacrylamide base polymer. According to one preferable embodiment the glyoxylation of the base polymer is performed as an on-site glyoxylation, preferably as an on-site glyoxylation of an aqueous base polymer composition at paper or board mill. A glyoxylated polyacrylamide produced on-site at paper or board mill is typically used immediately, or at least during next 1-3 days after on-site manufacturing. The obtained glyoxylated polyacrylamide with a net cationic charge density can be used in the chemical treatment system of the present invention directly with or without further dilution.

The glyoxylated cationic polyacrylamide especially suitable for use as the first component of the chemical treatment system of the present invention may be obtained by reacting the cationic polyacrylamide base polymer with 4-25 weight-%, preferably 8-15 weight-% of glyoxal, calculated from total weight of the glyoxal and the polyacrylamide base polymer. The glyoxal effectively reacts with the cationic polyacrylamide base polymer. The resulting glyoxylated polyacrylamide presents cationic sites in a manner that provide effective interaction, for example in form of ionic bonds, both with the fibres, especially recycled fibres, as well as the constituents of the second component of the chemical treatment system. Increased interaction and formation of bonds is assumed to increase the observed final strength.

The cationic polyacrylamide base polymer for the glyoxylated polyacrylamide of the first component may be obtained by polymerisation of acrylamide and at least one cationic monomer selected from a group consisting of diallyldimethylammonium chloride (DADMAC), 3-(acrylamidopropyl)trimethylammonium chloride (APTAC), and 3-(methacrylamidopropyl)trimethylammonium chloride (MAPTAC). These cationic monomers provide hydrolytic stability for the cationic polyacrylamide base polymer.

The cationic polyacrylamide base polymer may comprise at least 10 mol-% of cationic monomers. According to one embodiment the cationic polyacrylamide base polymer of the first component may be obtained by polymerisation of 10-50 mol-%, preferably 10-mol-%, more preferably 15-25 mol-%, of cationic monomers, preferably selected from the monomers defined above. The relatively high amount of cationic monomers used for the polyacrylamide base polymer provides effective interaction with the fibres and the anionic second component of the chemical treatment system. When the first component is added to the fibre stock, it may even provide the fibre stock with a positive zeta-potential. This offers more possible binding sites, e.g. for formation of ionic bonds, for the constituents of the second component.

According to the present invention the first component of the chemical treatment system is a glyoxylated polyacrylamide obtained by glyoxylation of a cationic polyacrylamide base polymer, which has a weight average molecular weight in a range of 30 000-500 000 g/mol. According to one preferable embodiment of the present invention, the cationic polyacrylamide base polymer may have a weight average molecular weight in a range of 40 000-400 000 g/mol, preferably 80 000-200 000 or 100 000-150 000 g/mol. The high weight average molecular weight of the cationic polyacrylamide base polymer provides a large molecular size for glyoxylated polyacrylamide of the first component. As noted above, the large molecular size of the first component may provide increased strength properties for the final paper or board. The number average molecular weight of the polyacrylamide base polymer may be from 5000 g/mol, preferably from 10 000 g/mol, more preferably from 15 000 g/mol, and up to 100 000 g/mol or less, preferably up to 75 000 g/mol or less, even more preferably up to 50 000 g/mol or less.

The second component of the chemical treatment system of the present invention is a mixture of at least a high-amylopectin starch and a first polymer. The high-amylopectin starch and the first polymer are preferably mixed with each other before the addition of the second component to the fibre stock. When mixed, the high-amylopectin starch and the first polymer form a complex which has an optimal spatial configuration and charge for interaction with the first component and fibres, especially recycled fibres. The second component is thus preferably in form of a single aqueous solution when added to the fibre stock. The high-amylopectin starch is in in form of a solution and the first polymer is in form of dispersion at the time of the mixing. For example, the second component may be obtained by effective mixing of starch solution into a dispersion of the first polymer.

The second component of the chemical treatment composition may have a net cationic charge density in a range from 0.05 meq/g to 0.9 meq/g, preferably from 0.07-0.7 meq/g, more preferably 0.1-0.3 meq/g, when measured at pH 2.8, and a net anionic charge in a range from −2 meq/g to −0.1 meq/g, when measured at pH 7. The charge densities are measured by using a Particle Charge Detector, Mütek PCD03. The second component of the treatment composition may preferably have a net anionic charge density in a range from −2 meq/g to −0.4 meq/g, preferably from −1.5 meq/g to −0.5 meq/g, when measured at pH 7.0. The defined net charge densities provide an easy handling of the second component during its manufacture, while guaranteeing the presence of sufficient anionic charges in order to provide an effective interaction with the first component of the treatment system.

According to one embodiment of the invention the second component of the treatment system comprises a high-amylopectin starch, preferably cationic high-amylopectin starch.

The high-amylopectin starch may have an amylopectin content 90 weight-%, preferably 95 weight-%, sometimes even more preferably 98 weight-%, calculated from the total dry weight of the starch. The first polymer may be cationic high-amylopectin starch selected from potato, waxy potato, rice, corn, waxy corn, wheat, barley, sweet potato or tapioca starch. Preferably the high-amylopectin starch is cationic waxy starch, for example cationic waxy corn starch or cationic waxy potato starch. The high-amylopectin starch is in form of an aqueous solution, which means that the high-amylopectin starch has been dissolved in water, e.g. by cooking. The cooking may be performed at temperature of 60-135° C. The dissolved high-amylopectin starch is free of starch granules, granular and/or particular starch structures.

According to one preferable embodiment the second component comprises high-amylopectin starch, which is cationic non-degraded high-amylopectin starch. In the present context this means high-amylopectin starch, which has been modified solely by cationisation, and which is non-degraded and non-cross-linked. According to one embodiment of the invention high-amylopectin starch of the second component may be cationic non-degraded high-amylopectin starch, which comprises starch units of which at least 70 weight-%, preferably at least 80 weight-%, more preferably at least 85 weight-%, even more preferably at least 90 weight-%, sometimes even more preferably at least 95 weight-%, have an average molecular weight MW over 20 000 000 g/mol, preferably over 50 000 000 g/mol, more preferably over 100 000 000 g/mol, sometimes even over 200 000 000 g/mol.

High-amylopectin starch may be cationised by any suitable method. Preferably starch is cationised by using 2,3-epoxypropyltrimethylammonium chloride or 3-chloro-2-hydroxypropyltrimethylammonium chloride, 2,3-epoxypropyltrimethylammonium chloride being preferred. It is also possible to cationise high-amylopectin starch by using cationic acrylamide derivatives, such as (3-acrylamidopropyl)-trimethylammonium chloride. The cationic high-amylopectin starch may have a substitution degree of 0.025-0.3, preferably 0.03-0.16, more preferably 0.045-0.1. The substitution degree is relative to the cationicity of the high-amylopectin starch.

The second component may comprise high-amylopectin starch in amount of 20-80 weight-%, preferably 30-60 weight-%, calculated from the total dry weight of the second component.

The second component of the chemical treatment system further comprises an anionic first polymer, which may be selected from carboxymethyl celluloses or from net anionic copolymers of (meth)acrylamide.

According to one preferable embodiment the anionic first polymer of the second component is anionic carboxymethyl cellulose. The anionic carboxymethyl cellulose may have a weight average molecular weight MW of at least 200 000 g/mol, preferably at least 250 000 g/mol, more preferably at least 300 000 g/mol or at least 350 000 g/mol. The weight average molecular weight MW may be in a range of 200 000-1 000 000 g/mol, preferably 250 000-900 000 g/mol, more preferably 300 000-750 000 g/mol, even more preferably 350 000-550 000 g/mol.

Carboxymethyl cellulose may have a degree of carboxymethyl substitution 0.4, preferably 0.5, more preferably 0.6. The degree of carboxymethyl substitution may be 0.4-1.0, preferably 0.5-0.9, providing good water-solubility. Carboxymethyl cellulose may have a charge density value <−1.1 meq/g, preferably in the range from −1.6 meq/g to −4.7 meq/g, more preferably from −2.1 meq/g to −4.1 meq/g, even more preferably from −2.5 meq/g to −3.8 meq/g, when measured at pH 7. All measured charge density values are calculated per weight as dry.

According to one preferable embodiment the first polymer of the second component may be obtained by polymerisation of (meth)acrylamide and at least one anionic monomer, which is selected from unsaturated mono- or dicarboxylic acids or their salts, such as acrylic acid, methacrylic acid, maleic acid, itaconic acid, crotonic acid, isocrotonic acid, and any of their mixtures. The anionic first polymer may thus be net anionic copolymer of (meth)acrylamide. The net anionic copolymer of (meth)acrylamide may be an anionic copolymer of (meth)acrylamide, comprising only polymer units originating from anionic monomers and (meth)acrylamide monomers. Alternatively, the net anionic copolymer of (meth)acrylamide may be a net anionic amphoteric copolymer of (meth)acrylamide, comprising polymer units originating from anionic monomers, cationic monomers and (meth)acrylamide monomers, provided that the anionic charges exceed the cationic charges in the copolymer. The net anionic copolymer of (meth)acrylamide may have a weight average molecular weight MW of at least 200 000 g/mol, preferably at least 500 000 g/mol. The weight average molecular weight MW may be in a range of 200 000-20 000 000 g/mol, preferably 500 000-10 000 000 g/mol, more preferably 500 000-8 000 000 g/mol.

The net anionic copolymer of (meth)acrylamide may be linear or crosslinked, and prepared by any suitable polymerisation method, such as solution polymerisation, dispersion polymerisation, emulsion or suspension polymerisation, inverse emulsion polymerisation, gel polymerisation or bead polymerisation.

According to one embodiment, the anionic first polymer of the second component is net anionic copolymer of (meth)acrylamide, prepared by gel polymerisation, dispersion polymerisation, emulsion or suspension polymerisation, inverse emulsion polymerisation, or by bead polymerisation, preferably by gel polymerisation. The net anionic copolymer of (meth)acrylamide may have a weight average molecular weight MW of at least 1 500 000 g/mol, preferably at least 2 000 000 g/mol, more preferably at least 3 000 000 g/mol. The weight average molecular weight MW may be in a range of 1 500 000-20 000 000 g/mol, preferably 2 000 000-15 000 000 g/mol, more preferably 3 000 000-10 000 000 g/mol.

According to one preferable embodiment, the anionic first polymer of the second component is net anionic copolymer of (meth)acrylamide, prepared by solution polymerisation, for example, of (meth)acrylamide and acrylic acid. The net anionic copolymer of (meth)acrylamide may have a weight average molecular weight MW of at least 200 000 g/mol, preferably at least 300 000 g/mol, more preferably at least 500 000 g/mol. The weight average molecular weight MW may be in a range of 200 000-2 000 000 g/mol, preferably 300 000-1 500 000 g/mol, more preferably 500 000-900 000 g/mol.

According to one embodiment of the invention the anionic first polymer of the second component may be obtained by polymerisation of (meth)acrylamide and at least one anionic monomer, and it may have an anionicity of 3-40 mol-%, preferably 5-18 mol-%, more preferably 9-15 mol-%. The anionicity relates to the amount of structural units in the anionic first polymer which originate from anionic monomers.

According to one embodiment of the invention the charge ratio of the cationic charge of the first component to the anionic charge of the second component, at pH 7, is from 4:1 to 1:1, given as absolute charges. The ratio of the first component to the second component is chosen so that the chemical treatment system is net cationic at the pH of the fibre stock, i.e. when the pH of the fibre stock is in the range from 5.5-9, preferably 6.5-8.

The first component of the chemical treatment system may be added to the fibre stock in amount of 0.5-5 kg/t, preferably 1-3 kg/t, and the second component of the chemical treatment system may added to the fibre stock in amount of 0.5-5 kg/t, preferably 1-3 kg/t.

The chemical treatment system according to the present invention is especially suitable for fibre stock, which comprises recycled fibres and/or chemical pulp. The chemical treatment system is especially suitable for fibre stock consisting of recycled fibres. The chemical treatment system according to the present invention is especially suitable for fibre stocks, preferably comprising or consisting of recycled fibres. The fibre stock may preferably have a conductivity of at least 1 mS/cm, preferably at least 2 mS/cm, sometimes even at least 4 mS/cm. The fibre stock may have conductivity in a range of 1-6 mS/cm, preferably 2-5 mS/cm.

EXPERIMENTAL

Some embodiments of the invention are described more closely in the following non-limiting examples.

Standards and devices used in evaluation of board/paper properties in the following examples are given in Table 1.

TABLE 1

Sheet testing devices and standard methods used in the examples.

| Measurement | Device | Standard |
|---|---|---|
| Basis weight | Mettler Toledo | ISO 536 |
| Short Span Compression test (SCT) | Lorentzen & Wettre | ISO 9895 |
| Burst strength | Lorentzen & Wettre | ISO 2758 |
| Corrugating Medium Test (CMT30) | Lorentzen & Wettre | ISO 7263 |
| Ring Crush Test (RCT) | Lorentzen & Wettre | Tappi T 822 om-02 |

Example 1

Example 1 studies the effect of a chemical treatment system on short span compression strength (SCT), burst strength and crushing resistance as measured by Corrugating Medium Test (CMT30).

Fibre stock for Example 1 was prepared from European recycled board (RCF).

The following chemical additives were used in Example 1:

GPAM: On-site glyoxylated polyacrylamide, dry content 4.4 weight-%. Base polymer obtained by polymerisation of 77 mol-% of acrylamide and 23 mol-% of diallyldimethylammonium chloride (DADMAC). The weight average molecular weight MW of the base polymer was 123 000 g/mol, determined by size exclusion chromatography, calibrated by polyethylene oxide (PEO) calibration standards. The number average molecular weight Mn of the base polymer was 34 000 g/mol.

PEC1: Polyelectrolyte complex comprising cationic waxy starch, DS 0.07 (50 weight-% of the complex), and an anionic polyacrylamide obtained by polymerisation of 89 mol-% of acrylamide and 11 mol-% of acrylic acid, (MW 593 000 g/mol, Mn 51 000 g/mol, 50 weight-% of the complex). pH of the polyelectrolyte complex was 6.5, and the charge density was 0.20 meq/g, when measured at pH 2.8, and −0.55 meq/g, when measured at pH 7.

PEC2: Polyelectrolyte complex comprising cationic waxy starch, DS 0.07 (58 weight-% of the complex) and carboxymethylcellulose CMC, DS 0.7 (MW 450 000 g/mol, 42 weight-% of the complex). pH of the polyelectrolyte complex was 6.5, and the charge density 0.23 meq/g, when measured at pH 2.8, and −1.1 meq/g, when measured at pH 7.

GPAM addition level was 3.5 kg/t and PEC1 or PEC2 addition level was 2.5 kg/t. Chemical addition levels are given as kg dry chemical per ton dry fibre stock.

Handsheets, 110 g/m$^2$, were formed by using Rapid Koethen sheet former. The procedure was as follows: RCF was wet disintegrated (without soaking) in 3% consistency at 70° C. with Noviprofibre-pulper for 30 s at 500 rpm and for 25 min at 1000 rpm. Obtained wet disintegrated fibre stock was further diluted to 0.6% consistency with tap water, and pH and conductivity of the fibre stock were adjusted to pH 6.8 and conductivity 4.0 mS/cm. Additions of the chemical additives were made to mixing vessel at mixing speed 1000 rpm.

GPAM was added first to pulp at 60 seconds before sheet forming and the used PEC after that at 40 seconds before sheet forming. All tests included addition of cationic polyacrylamide, 100 g/t, and silica, 400 g/t, as retention aids.

After additions of the chemical additives the fibre stock was poured to Rapid Koethen sheet former and water was drained out through wire with suction. The formed handsheet was removed from wire and dried with vacuum dryer. Before testing in the laboratory, handsheets were pre-conditioned for 24 h at 23° C. in 50% relative humidity, according to the standard ISO 187.

The obtained handsheets were tested for burst strength, SCT strength and crushing resistance CMT30 by using standards and devices defined in Table 1.

The test results are given in Table 2. It can be seen from the results in Table 2 that the chemical treatment system comprising GPAM as a first component and PEC1 or PEC2 as a second component significantly improved all the strength properties compared to the use of GPAM alone.

TABLE 2

Results of Example 1 showing the effect of different strength systems on board properties.

| Test # | Used strength additives | SCT index [Nm/g] | Burst index [kPam$^2$/g] | CMT30 [Nm$^2$/g] |
|---|---|---|---|---|
| Ref. | None | 20.5 | 1.84 | 0.81 |
| E1-1 | GPAM | 23.1 | 2.08 | 0.95 |
| E1-2 | GPAM + PEC1 | 24.2 | 2.23 | 1.02 |
| E1-3 | GPAM + PEC2 | 23.8 | 2.09 | 1.00 |

Example 2

Example 2 studies the effect of a chemical treatment system on burst strength and crushing resistance measured by Ring Crush Tester (RCT).

Fibre stock for Example 1 was prepared from Chinese Old Corrugated Container board (OCC).

Handsheets, 110 g/m$^2$, were formed by using Rapid Koethen sheet former. The procedure was as follows: RCF was wet disintegrated (without soaking) in 3% consistency at 70° C. for 30000 rounds at a laboratory pulper. Obtained wet disintegrated fibre stock was further diluted to 1% consistency with tap water, and pH and conductivity of the fibre stock were adjusted to pH 7 and conductivity 3.0 mS/cm. Additions of the chemical additives were made to mixing vessel at mixing speed 1000 rpm.

The same chemical additives than in Example 1 were used in Example 2:

GPAM was added at addition level 1.5 kg/t or 2.5 kg/t and PEC1 or PEC2 were added at addition level 1 kg/t or 2 kg/t. Chemical addition levels are given as kg dry chemical per ton dry fibre stock.

GPAM was added first to pulp at 60 seconds before sheet forming and the used PEC after that at 40 seconds before sheet forming. All tests included addition of cationic poly-acrylamide, 300 g/t, as retention aids.

After additions of the chemical additives the fibre stock was poured to Rapid Koethen sheet former and water was drained out through wire with suction. The formed hand-sheet was removed from wire and dried with vacuum dryer. Before testing in the laboratory, handsheets were pre-con-ditioned for 24 h at 23° C. in 50% relative humidity, according to the standard ISO 187.

The obtained handsheets were tested for burst strength and crushing resistance RTC by using standards and devices defined in Table 1.

The test results are given in Table 3. It can be seen from the results in Table 3 that the chemical treatment system comprising GPAM as a first component and PEC1 or PEC2 as a second component significantly improved all the strength properties compared to the use of GPAM alone.

Even if the invention was described with reference to what at present seems to be the most practical and preferred embodiments, it is appreciated that the invention shall not be limited to the embodiments described above, but the inven-tion is intended to cover also different modifications and equivalent technical solutions within the scope of the enclosed claims.

TABLE 3

Results of Example 2 showing the effect of different strength systems on board properties.

| Test # | Used strength additives | RCT index [Nm/g] | Burst index [kPam²/g] |
|---|---|---|---|
| Ref. | None | 6.73 | 0.72 |
| E2-1 | GPAM 1.5 kg/t | 7.19 | 0.84 |
| E2-2 | GPAM 2.5 kg/t | 7.50 | 0.93 |
| E2-3 | GPAM 1.5 kg/t + PEC1 1 kg/t | 7.73 | 0.94 |
| E2-4 | GPAM 1.5 kg/t + PEC1 2 kg/t | 8.04 | 0.97 |
| E2-5 | GPAM 1.5 kg/t + PEC2 1 kg/t | 7.34 | 0.92 |
| E2-6 | GPAM 1.5 kg/t + PEC2 2 kg/t | 7.79 | 1.00 |
| E2-7 | GPAM 2.5 kg/t + PEC1 1 kg/t | 7.79 | 0.97 |
| E2-8 | GPAM 2.5 kg/t + PEC1 2 kg/t | 8.17 | 1.04 |
| E2-9 | GPAM 2.5 kg/t + PEC2 1 kg/t | 7.81 | 0.98 |
| E2-10 | GPAM 2.5 kg/t + PEC2 2 kg/t | 7.77 | 0.89 |

The invention claimed is:

1. A chemical treatment system for application to a fibre stock in a manufacture of paper or board, the treatment system comprising
   a first component, which is a glyoxylated polyacrylamide having a net cationic charge density and obtained by glyoxylation of a cationic polyacrylamide base poly-mer having a weight average molecular weight MW in a range of 80,000-500,000 g/mol, and
   a second component, which comprises a mixture of at least
      a cationic high-amylopectin starch, having amylopectin content of ≥90 weight-%, and an anionic first polymer, which has a weight average molecular weight MW >200,000 g/mol,
   wherein the second component has a net cationic charge density in a range from 0.05 meq/g to 0.9 meq/g, when measured at pH 2.8, and a net anionic charge density in a range from –2 meq/g to –0.1 meq/g, when measured at pH 7.

2. The chemical treatment system according to claim 1, wherein the second component has the net anionic charge density in a range from –2 meq/g to –0.4 meq/g, measured at pH 7.

3. The chemical treatment system according to claim 1, wherein the charge ratio of the cationic charge of the first component to the anionic charge of the second component, at pH 7, is from 4:1 to 1:1.

4. The chemical treatment system according to claim 1, wherein the amylopectin content of the cationic high-amy-lopectin starch is ≥95 weight-%, calculated from the total dry weight of the starch.

5. The chemical treatment system according to claim 1, wherein the anionic first polymer of the second component is selected from carboxymethyl celluloses or from net anionic copolymers of (meth)acrylamide.

6. The chemical treatment system according to claim 5, wherein the first anionic polymer is a net anionic copolymer of (meth)acrylamide, which has a weight average molecular weight of at least 1,500,000 g/mol.

7. The chemical treatment system according to claim 5, wherein the first anionic polymer is carboxymethyl cellu-lose, which has a weight average molecular weight of at least 200,000 g/mol.

8. The chemical treatment system according to claim 1, wherein the second component comprises high-amylopectin starch in amount of 20-80 weight-%.

9. The chemical treatment system according to claim 1, wherein the cationic polyacrylamide base polymer of the first component has a weight average molecular weight in a range of 80,000-200,000 g/mol.

10. The chemical treatment system according to claim 1, wherein the cationic polyacrylamide base polymer of the first component is obtained by polymerisation of acrylamide and at least one cationic monomer selected from the group consisting of diallyldimethylammonium chloride (DADMAC), 3-(acrylamidopropyl)trimethylammonium chloride (APTAC), and 3-(methacrylamidopropyl)trimeth-ylammonium chloride (MAPTAC).

11. The chemical treatment system according to claim 1, wherein the cationic polyacrylamide base polymer of the first component is obtained by polymerisation of 10-50 mol-% of cationic monomers.

12. The chemical treatment system according to claim 1, wherein the first component is a glyoxylated polyacrylamide obtained by reacting the cationic polyacrylamide base poly-mer with 4-25 weight-%, calculated from total weight of the glyoxal and the polyacrylamide base polymer.

13. A method to improve strength properties of paper or board or the like, the method comprising:
   applying the chemical treatment system of claim 1 to a fibre stock.

14. The method according to claim 13, wherein the first component of the chemical treatment system is added to the fibre stock in amount of 0.5-5 kg/t, and the second compo-nent of the chemical treatment system is added to the fibre stock in amount of 0.5-5 kg/t.

15. The method according to claim 13, wherein the fibre stock comprises recycled fibres, and/or the fibre stock has a conductivity of at least 2 mS/cm.

16. The method according to claim 13, wherein the first component and the second component of the chemical treatment system are added to the fibre stock separately and successively.

17. A method for manufacture of paper, board or the like, comprising obtaining a fibre stock comprising cellulosic fibres, adding to the fibre stock a chemical treatment system according to claim 1, wherein the first component and the second component are added to the fibre stock in form of aqueous solutions.

18. The method according to claim 17, wherein the second component is formed by mixing the high-amylopectin starch and the first polymer with each other before the addition of the second component to the fibre stock.

19. The method according to claim 17, wherein the first component and the second component are added to the fibre stock having a consistency at least 2 weight-%, calculated as dry fibre.

20. The method according to claim 17, wherein the first component is obtained by on-site glyoxylation of an aqueous base polymer composition.

\* \* \* \* \*